Aug. 17, 1965  F. J. CLIMENT ETAL  3,200,585

HIGH TEMPERATURE GAS NOZZLE FOR ROCKET MOTOR

Filed May 10, 1962  2 Sheets-Sheet 1

INVENTORS
FRANCIS J. CLIMENT
EDWIN M. CORBIN

BY

ATTORNEY

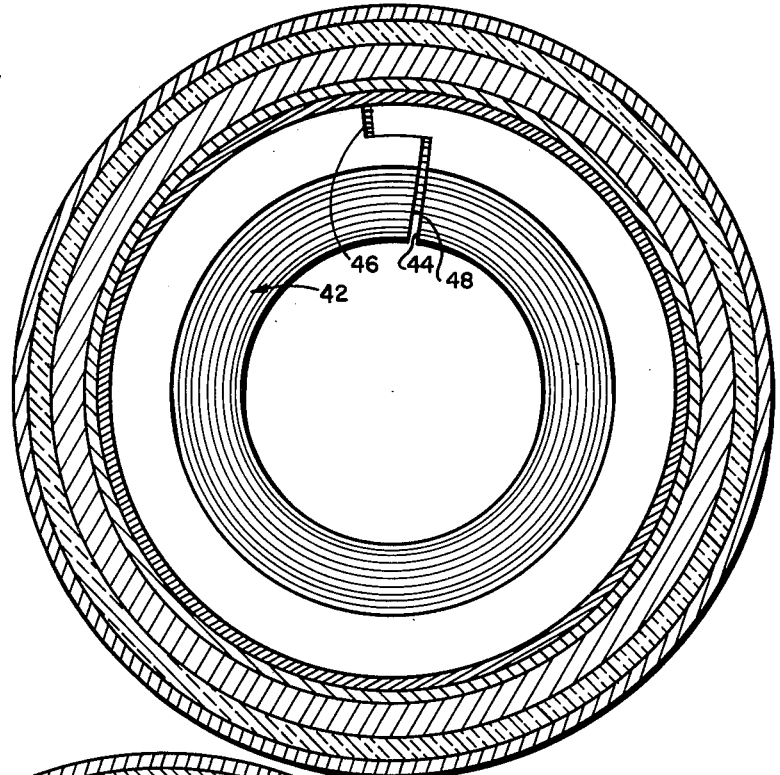
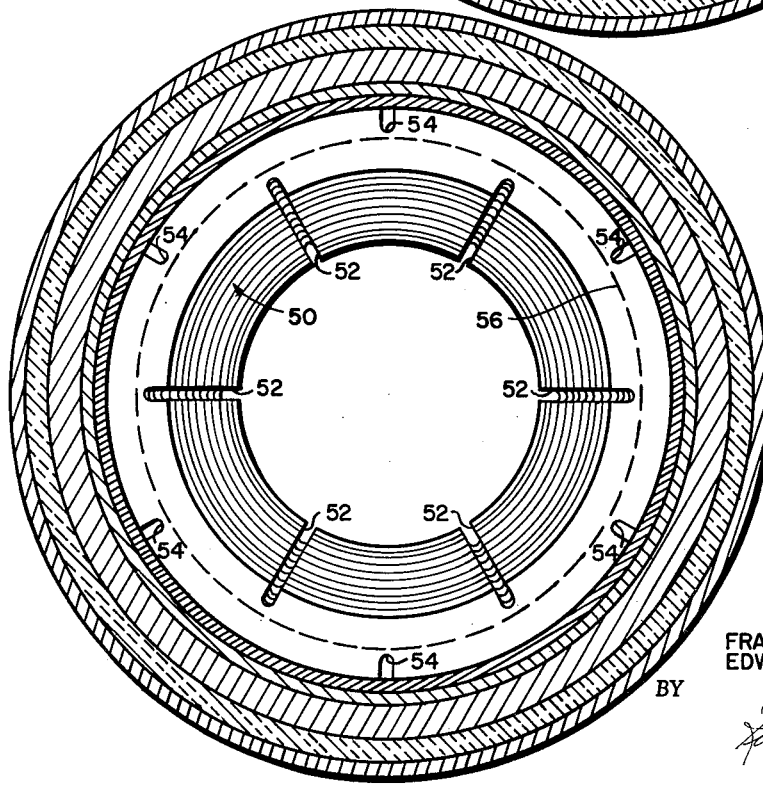

United States Patent Office 3,200,585
Patented Aug. 17, 1965

3,200,585
HIGH TEMPERATURE GAS NOZZLE FOR
ROCKET MOTOR
Francis J. Climent, Sacramento, and Edwin M. Corbin,
Pleasanton, Calif., assignors to Aerojet-General Corporation, Azusa, Calif., a corporation of Ohio
Filed May 10, 1962, Ser. No. 195,016
14 Claims. (Cl. 60—35.6)

This invention relates to a nozzle and more particularly to a high temperature gas nozzle for a rocket motor.

The thrust of a rocket motor depends, among other factors, on the temperature of the exhaust gases produced by the combustion of the fuel, and in general for a particular rocket motor, the higher the temperature of the exhaust gases, the greater the thrust of the rocket. One of the factors limiting the thrust obtainable from a rocket is the ability of the materials composing the rocket motor to withstand the high temperatures produced by the combustion of the gases. This is particularly true of the throat of the rocket motor nozzle, because of the severe conditions prevailing there. As a consequence, there is a tendency for the throat of the rocket motor to erode and change in size while the rocket motor is operating. Since the performance of a rocket motor is very sensitive to changes in the physical dimensions of the throat, erosion can have important effects on the rocket motor performance.

In order to minimize erosion at the throat of the rocket motor nozzle, the present practice is to provide the rocket motor with a throat insert formed from an erosion-resistant material such as tungsten. The tungsten throat insert is usually tubular in form with an inner convergent-divergent surface. This throat is usually mounted in a refractory material or a material such as graphite which serves as a heat sink.

In present solid rocket nozzle designs, very high thermal stresses are developed in these inserts during firing due to the contact of the hot gases with the inner convergent-divergent surface of the insert. In particular, axial and tangential (hoop) compressive stresses are occasioned at the inside diameter of the insert, while the axial and tangential stresses at the outside diameter are tensile. The effect of the tensile stresses at the outside diameter of the insert is to produce thermal cracks in the insert which can in some instances destroy the structural integrity of the insert and/or its assembly, causing a motor malfunction.

The effect of the compressive stresses at the inner diameter of the insert, when subjected to high temperature caused by contact with the hot gases in the nozzle causes some of the material at and near the inner periphery of the insert to become plastic. This means that the stresses in the inner surface of the tubular insert are beyond the elastic limit and the material can flow or deform readily. The on-rushing high velocity gases inside the rocket motor nozzle which contains minute particles of solid matter tend to blow away these plastic layers on the inner surface of the insert, thereby distorting the geometry of the throat. This effect is in addition to the normal erosion on the insert material. Consequently, compressive stresses at the inside diameter of the tubular insert substantially increase the erosion process. It is apparent that if critical thermal stresses in the insert can be minimized, structural failure of the insert can be prevented and erosion at the inner surface can be reduced.

What is needed, therefore, and comprises an important object of this invention, is to provide an insert for a high temperature gas nozzle which can withstand intense heat applied to the inner surface thereof without developing either large tensile stresses at the outside diameter or large compressive stresses at the inside diameter.

The invention in its broadest aspect comprises forming the insert from a plurality of split tungsten washers. These tungsten washers are stacked together to form a generally tubular laminated insert. When heat is applied to the inner surface of the insert, the faces of the individual washers are free to expand thermally. As a result, the development of thermal stresses in the insert is substantially eliminated. Consequently cracking at the outside diameter of the insert and accelerated throat erosion at the inside diameter of the insert are minimized.

This and other objects of this invention will become more apparent when read in the light of the accompanying drawings and specification wherein:

FIGURE 3 is a cross-sectional view of a rocket motor nozzle showing a modified laminated insert formed from washers having a zig-zig split; and FIGURE 4 is a cross-sectional view of a rocket motor nozzle showing a modified laminated insert formed from washers with outwardly and inwardly extending slits at the inside and outside washer diameters.

Figure 1:
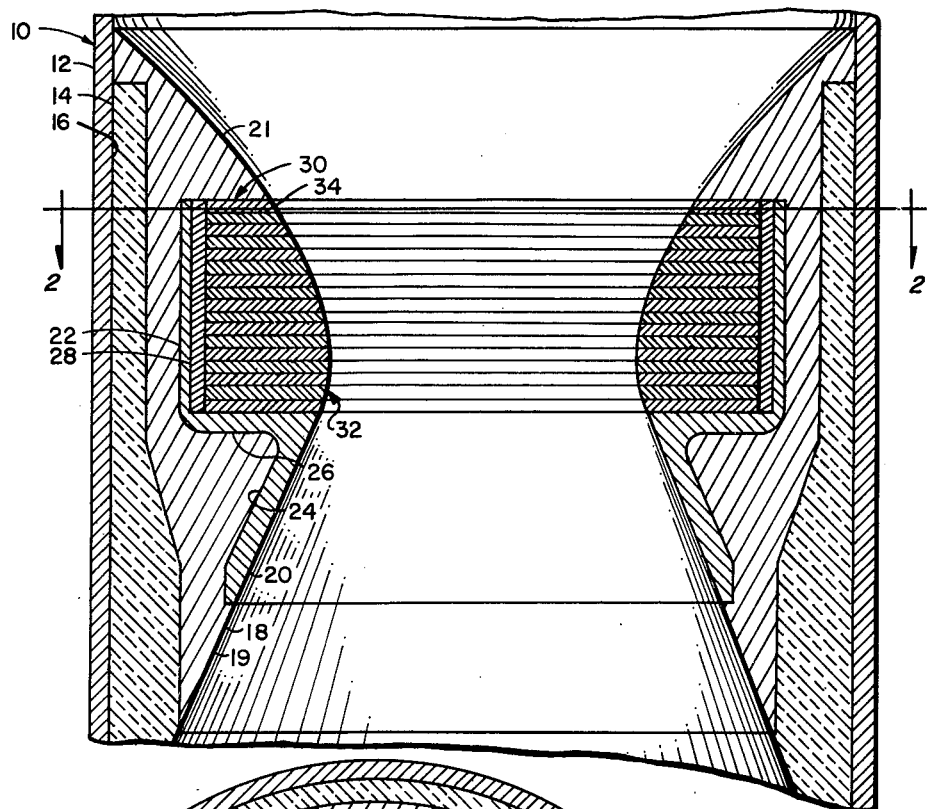
FIGURE 1 is a longitudinal sectional view of the portion of a rocket motor nozzle at and adjacent to the throat region.

Referring now to FIGURE 1 of the drawings, a longitudinal sectional view of a portion of a rocket motor nozzle 10 adjacent the throat portion is shown as comprising an outer external housing 12 formed from steel or other structural material. An insulating material 14, such as asbestos or other fibrous material is secured to the inner surface 16 of housing 12 by any suitable means. A heat sink 18, tubular in form and with inner converging surfaces 19 and 21 is mounted in the housing 12 by any suitable means (not shown) with the insulation 14 positioned therebetween.

An insert positioning structure 20 formed from a refractory material such as tungsten, properly designed for structural performance, is positioned by any suitable means (not shown) in a correspondingly shaped recess formed in the graphite heat sink. As shown in FIGURE 1, the insert positioning structure comprises a generally cylindrical portion 22 and a reduced diverging conical portion 24 connected together by a back wall 26. For reasons to become apparent below, a tubular back-up member 28 formed from a comparatively soft material such as copper is mounted in cylindrical portion 22.

An insert 30 for the nozzle comprises one or a plurality of washers 32 stacked together in end-to-end relationship to form a tubular laminate. The washers are formed from an erosion resistant material such as tungsten and, as seen in FIGURE 1, have the same outside diameter. However, the inside diameter of the successive washers forming the insert vary in such a way as to form a smooth inner converging-diverging surface 34.

Figure 2:
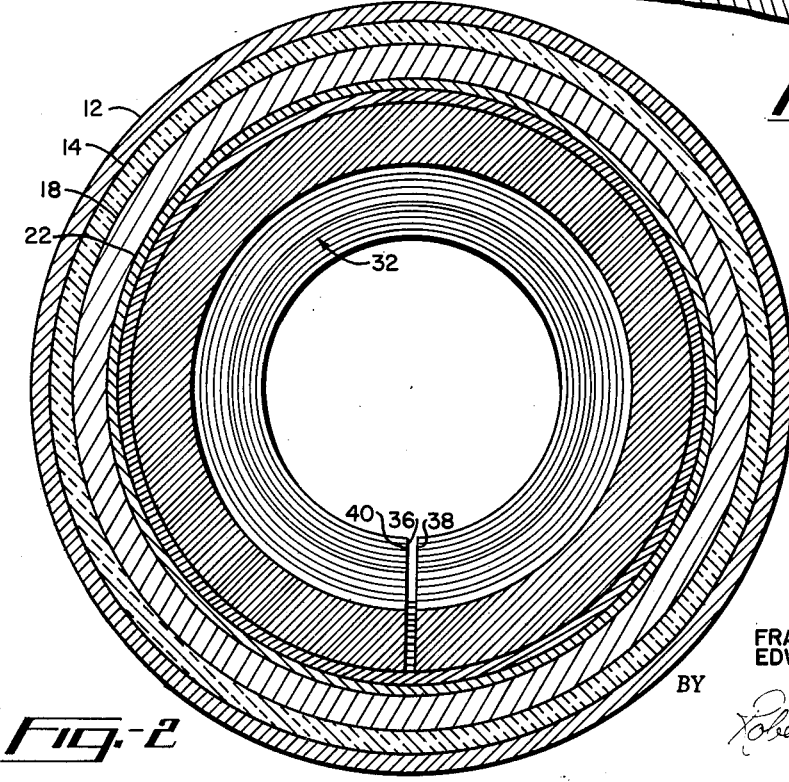
FIGURE 2 is a cross-sectional view taken on the lines 2—2 of FIGURE 1 showing the nozzle insert formed from washers, each having a simple radial split.

In the embodiment shown in FIGURE 1, each of the washers 32 is provided with a slit 36 defining washer ends 38 and 40 (see FIGURE 2). Furthermore, the slits 36 in adjacent washers are displaced angularly from each other to prevent gases from flowing through them.

The washers may be formed from tungsten or other refractory material. In addition, it is contemplated that the laminate of washers could be formed from washers of different materials alternately placed. For example, tungsten alternating with pyrolytic graphite washers will reduce weight and facilities heat transfer to the heat sink.

When the rocket motor or high temperature gas nozzle is in operation, heat applied to the inner surface 34 of the tubular laminate 30 produces a thermal expansion in the washers. However, since the split ends 38 and 40 of the washers are free to move and any expansion of the outside diameter of the washers is into the comparatively soft back-up material 28, thermal stresses in the washers are substantially eliminated, while the back-up material deforms under the pressure of the washer expansion and to some extent melts and flows out of the nozzle assembly. With this arrangement, uncontrolled splits or fractures at the outside diameter of the individual washers and plastic deformation due to compressive forces at the inside diameter are substantially eliminated. Consequently, erosion of the nozzle throat is minimized and structural failure of the insert due to unfavorable random cracking is prevented.

Another advantage of the insert structure described above is that the refractory insert positioning structure 20 with the tubular copper back-up 28 and the tungsten washers 32 mounted therein, and bearing or seating aginst the back wall 26 of the insert positioning structure, can be assembled outside the rocket motor housing and inserted as an assembled unit therein. Furthermore, the washers may be installed in the back-up 28 separately or attached to each other and to the back-up by brazing, or other suitable techniques.

In circumstances where the passage of gas through the washer splits proves to be a serious problem, the washer structure can be modified, as shown in FIGURE 3, wherein the tungsten washers 42 are each provided with a zigzag slit 44 defining washer ends 46 and 48. With this arrangement, when heat is applied to the insert, the thermal expansion in the washers causes a tangential sliding movement of the ends of the washers without opening a gap between them which could result in the flow of gases to the outer surface of the insert.

As stated above, when heat is applied to the inside diameter of a tubular element, compressive stresses are formed at the inside diameter and tensile stresses are formed at the outside diameter. Consequently there is some region between the inside and outside diameter which is stress-free. Advantage may be taken of this by designing a laminate insert for the rocket motor nozzle with washers which are not split at all. In particular, as shown in FIGURE 4, the washers 50 composing the insert, are provided with outwardly extending notches or slits 52 extending from the inside diameter of the washer, and inwardly extending notches or slits 54 extending inward from the outside diameter of the washer. The essentially stress-free zone of the washers is indicated by the dotted line 56 and it is noted that none of the notches 52 or 54 cross this zone. With this arrangement, the thermal stresses in the washers are entirely relieved without cracking at the outside diameter or developing compressive stresses at the inside diameter. At the same time it is impossible for gas to flow through the notches or slits in the insert. It is evident, therefore, that the above-described modification can be used in instances where the gas penetration of the insert is a serious problem.

It is to be understood that the form of the invention herewith shown and described is to be taken as an example of the same, and that various changes in the shape, size, and arrangement of the parts may be restored to without departing from the spirit of this invention or the scope of the claims.

We claim:

1. A high temperature gas nozzle of the class described comprising an external housing, a heat absorbing material mounted in said housing to serve as a heat sink, an insert mounted in said housing in fixed relation to said heat sink, said insert comprising a plurality of washers formed from a high temperature erosion-resistant material, said washers stacked together to form a tubular laminate with the inner surface of the tubular laminate adapted to face the hot gas stream in the nozzle and shaped to define a nozzle throat, the inside diameter edge of each washer provided with a generally outwardly extending slot and the outside diameter edge of each washer provided with a generally inwardly extending slot spaced from the generally outwardly extended slot provided in the inside diameter edge of said washer, so that when heat is applied to the throat of the insert, the introduction of compressive thermal stresses at the inside diameter of each washer, and the introduction of tensile thermal stresses at the outside diameter of each washer, is minimized, while the structural integrity of the tubular laminate is not disturbed by thermal changes in the size of the washers.

2. A high temperature gas nozzle of the class described comprising an external housing, a heat absorbing material mounted in said housing to serve as a heat sink, an insert mounted in said housing in fixed relation to said heat sink, said insert comprising a plurality of washers formed from a high temperature erosion-resistant material, said washers stacked together to form a tubular laminate with the inner surface of the tubular laminate adapted to face the hot gas stream in the nozzle and shaped to define a nozzle throat, a tubular back-up member mounted in said housing, the outer edges of said washers secured to the inner surface of the tubular back-up member whereby the washers are held together in stacked relationship, at least the inner surface of the tubular back-up member formed from a material soft in comparison to the material composing the washers whereby when heat from the hot gas stream is applied to the insert, the outer edges of the washers can expand into the soft inner surface of the tubular back-up member without introducing distortion in the washers, each washer in the tubular laminate shaped so when heat from the hot gas stream is applied to the insert the introduction of thermal stresses at the inside and outside diameter of the washers are minimized and the structural integrity of the tubular laminate insert is not disturbed.

3. A rocket motor nozzle of the class described comprising an external housing, a heat absorbing material mounted in said housing to serve as a heat sink, an insert mounted in said housing in fixed relation to said heat sink, said insert comprising a plurality of washers formed from a high temperature erosion-resistant material, said washers stacked together to form a tubular laminate with the inner surface of the tubular laminate adapted to face the hot gas stream in the nozzle and shaped to define a nozzle throat, a tubular back-up member mounted in said housing, the outer edges of said washers secured to the inner surface of the tubular back-up member whereby the washers are held together in stacked relationship, at least the inner surface of the tubular back-up member formed from a material soft in comparison to the material comprising the washers whereby when heat from the hot gas stream is applied to the insert the outer edges of the washers can expand into the soft inner surface of the tubular back-up member without introducing distortion in the washers each washer in the tubular laminate provided with outwardly extending slots at the inside diameter edge and inwardly extending slots at the outside diameter edge so when heat from the hot gas stream is applied to the insert, the development of thermal stresses at the inside and outside diameter of the washers is minimized and the structural integrity of the tubular laminate insert is not disturbed.

4. A rocket motor gas nozzle of the class described comprising an external housing, a heat absorbing material mounted in said housing to serve as a heat sink, an insert mounted in said housing in fixed relation to said heat sink, said insert comprising one or more washers formed from a high temperature erosion resistant material, said washers stacked together to form a tubular laminate with the inner surface of the tubular laminate adapted to face the hot gas stream in the nozzle and shaped to define a nozzle throat, a tubular back-up member mounted in said housing, the outer edges of said washers secured to the inner surface of the tubular back-up member whereby the washers are held together in stacked relationship, at least the inner surface of the tubular back-up member formed from a material soft in comparison to the material composing the washers whereby when heat from the hot gas stream is applied to the insert the outer edges of the washers can expand into the soft inner surface of the tubular back-up member without introducing distortion in the washers, each washer in the tubular laminate split so when heat from the hot gas stream is applied to the insert, the introduction of thermal stresses at the inside and outside diameters of the washers are minimized and the structural integrity of the tubular laminate is not disturbed.

5. The high temperature gas nozzle described in claim 4 wherein the splits in the washers in the tubular laminate insert are in spaced angular relationship to each other to prevent gas flow through the splits in the washers.

6. A high temperature gas nozzle of the class described comprising an external housing, a heat absorbing material mounted in said housing to serve as a heat sink, an insert mounted in said housing in fixed relation to said heat sink with a surface facing the hot gas stream of the nozzle and shaped to define the nozzle throat, said insert formed from a high temperature erosion-resistant material and comprising a plurality of washers forming a tubular laminate, each washer of the tubular laminate provided with a zig-zag split so when heat from the hot gas stream is applied to the insert a tangential sliding movement of the ends of the washer occurs without opening a gap between the ends of the washers whereby the introduction of thermal stresses in the washers are minimized without permitting a flow of gas through the ends of the washers, and the effective relationship between the washers in the tubular laminate insert is not disturbed.

7. A throat insert for a high temperature gas nozzle comprising a tubular support member, at least the inner surface of the tubular support member formed from a soft material, a plurality of washers formed from a hard high temperature erosion-resistant material, said washers stacked together to form a tubular laminate with the inner surface of the tubular laminate adapted to face the hot gas stream, the inside diameter of the stack of washers varying in such a way as to form a convergent-divergent nozzle throat portion adapted to face the hot gas stream in the nozzle, the outer edges of said washers secured to the soft inner surface of the tubular back-up member whereby the washers are held together and when heat from the hot gas stream is applied to the insert the outer edges of the washers can expand into the soft inner surface of the tubular back-up member without introducing distortion in the washers, each washer in the tubular laminate shaped so when heat from the hot gas stream is applied to the insert, the introduction of thermal stresses at the inside and outside diameter edges of the washers is minimized and the structural integrity of the tubular laminate is not disturbed.

8. The throat insert described in claim 7 wherein the washers in the tubular laminate are split to minimize the introduction of thermal stresses at the inside diameter edge and the outside diameter edge of each of the washers.

9. The throat insert described in claim 7 wherein the washers in the tubular laminate are each provided with a zig-zag split so when heat is applied to the insert the resulting tangential sliding movement of the ends of the washers permit the washers to respond to the heat without introducing thermal stresses at the inside edge diameter or the outside edge diameter.

10. The throat insert described in claim 8 wherein the splits in the stack of washers are in spaced angular relationship to each other to prevent the flow of gas through the split portions of the nozzles.

11. A throat insert for a high temperature gas nozzle comprising a tubular member formed from a refractory material, said tubular member comprising a cylindrical portion and a reduced diverging generally conical portion connected together by a wall member, a tubular back-up member mounted inside the cylindrical portion of the tubular member, at least the inner surface of the tubular member formed from a soft material, a plurality of washers formed from a hard high temperature erosion resistant material, said washers stacked together to form a tubular laminate with the inner surface of the tubular laminate adapted to face the hot gas stream, the inside diameter of the stack of washers varying in such a way as to form a convergent-divergent nozzle throat portion, the outer edges of said washers secured to the soft inner surface of the tubular back-up member with the stack of washers seated against said wall member whereby the washers are held together in the tubular member and when heat from the hot gas stream is applied to the insert, the outer edges of the washers can expand into the soft inner surface of the tubular back-up member without introducing distortion in the washers, each washer in the tubular laminate split so when heat from the hot gas stream is applied to the insert, the introduction of thermal stresses at the edges of the inside and outside diameters of the washers is minimized.

12. A high temperature gas nozzle of the class described comprising an external housing, a heat absorbing material mounted in said housing to serve as a heat sink, an insert mounted in said housing in fixed relation to said heat sink, said insert comprising a plurality of washers made of a high temperature erosion-resistant material, said washers stacked together to form a tubular laminate with the inner surface of the tubular laminate adapted to face the hot gas stream in the nozzle and shaped to define a nozzle throat, said washers being formed from different materials alternately placed, each washer in the tubular laminate shaped so when heat from the hot gas stream is applied to the insert, the washers can individually thermally respnod to the heat without the introduction of significant thermal stresses in the washers, while the structural integrity of the tubular laminate is not disturbed by the thermal changes in the size of the washers.

13. The high temperature gas nozzle set forth in claim 12, wherein alternately placed washers comprising the tubular laminate are formed from tungsten and pyrolytic graphite.

14. A high temperature gas nozzle of the class described comprising an external housing, a heat absorbing material mounted in said housing to serve as a heat sink, an insert mounted in said housing in fixed relation to the heat sink with a surface facing the hot gas stream of the nozzle and shaped to define a nozzle throat, said insert being formed from a high temperature erosion-resistant material and comprising a plurality of washers stacked together to form a tubular laminate, each of said washers in the tubular laminate being split so when heat from the hot gas stream is applied to the insert, the washers can individually respond to the heat so that the introduction of compressive thermal stresses at the inside diameter of the washers and the introduction of tensile thermal stresses at the outside diameter of the washers are minimized, the splits in said washers comprising the tubular laminate being disposed in spaced angular relationship to each other to prevent the flow of hot gases through the splits in the washers, and said washers being formed from tungsten and pyrolytic graphite in alternating relationship.

References Cited by the Examiner

UNITED STATES PATENTS 2,695,495  11/54  Peterman _____ 60—35.6
3,032,982  5/62   Gaubatz _____ 60—35.6

FOREIGN PATENTS 705,847  3/54  Great Britain.

SAMUEL LEVINE, *Primary Examiner.*